(12) United States Patent
Powers, III

(10) Patent No.: US 8,511,007 B2
(45) Date of Patent: Aug. 20, 2013

(54) SOLAR SUPPORT STRUCTURE

(76) Inventor: John Powers, III, Phoenix, AZ (US)

(*) Notice: Subject to any disclaimer, the term of this patent is extended or adjusted under 35 U.S.C. 154(b) by 109 days.

(21) Appl. No.: 13/036,858

(22) Filed: Feb. 28, 2011

(65) Prior Publication Data

US 2012/0216466 A1 Aug. 30, 2012

(51) Int. Cl.
*E04D 13/18* (2006.01)

(52) U.S. Cl.
USPC ............ 52/173.3; 52/79.1; 52/91.3; 136/245

(58) Field of Classification Search
USPC ................. 136/245, 246, 251; 52/79.1, 91.1, 52/91.3, 173.3, 843
See application file for complete search history.

(56) References Cited

U.S. PATENT DOCUMENTS

| | | | | |
|---|---|---|---|---|
| 2,023,814 A * | 12/1935 | Samuel | ............. | 52/91.3 |
| 3,127,960 A * | 4/1964 | Smith et al. | .............. | 52/222 |
| 3,332,197 A * | 7/1967 | Hinkle | ............. | 52/844 |
| 4,809,476 A * | 3/1989 | Satchell | ............. | 52/241 |
| 5,010,709 A * | 4/1991 | Paz | ............. | 52/658 |
| 5,125,608 A * | 6/1992 | McMaster et al. | ......... | 248/163.1 |
| 6,755,004 B1 * | 6/2004 | Power et al. | ............. | 52/845 |
| 6,901,708 B1 * | 6/2005 | Powers, III | ............. | 52/91.1 |
| 7,285,719 B2 * | 10/2007 | Conger | ............. | 136/245 |
| 7,888,587 B2 * | 2/2011 | Shingleton et al. | ......... | 136/246 |
| 2006/0096201 A1 * | 5/2006 | Daudet | ............. | 52/272 |
| 2006/0207192 A1 * | 9/2006 | Durham | ............. | 52/73 |
| 2009/0211621 A1 * | 8/2009 | LeBlanc | ............. | 136/244 |
| 2011/0030285 A1 * | 2/2011 | Kaufman | ............. | 52/82 |
| 2011/0094088 A1 * | 4/2011 | Potter et al. | ............. | 29/592.1 |
| 2011/0094559 A1 * | 4/2011 | Potter et al. | ............. | 136/244 |

* cited by examiner

*Primary Examiner* — Brian Glessner
*Assistant Examiner* — Adriana Figueroa
(74) *Attorney, Agent, or Firm* — Parsons & Goltry; Robert A. Parsons; Michael W. Goltry

(57) ABSTRACT

A solar support structure includes a plurality of sections, each section including a channel member having a flat major wall and opposed side walls extending therefrom. The major wall of each section is covered with a thin film solar laminate and each section further includes an electrical connection box positioned adjacent one end and electrically coupled to the thin film solar laminate. The sections are formed into a roof panel by channel-shaped beams attached to opposed ends of each section and the beams mount the sections in a parallel abutting relationship. Columns are affixed to the beams and mount the roof panel in a desired orientation relative to an underlying surface. Electrical wiring from the boxes is positioned in one of the beams and extends into one of the columns.

7 Claims, 4 Drawing Sheets

SOLAR SUPPORT STRUCTURE

FIELD OF THE INVENTION

This invention generally relates to flat roof structures supporting solar energy systems.

BACKGROUND OF THE INVENTION

At the present time, generating electrical energy by installing and operating solar panels on roofs and other areas normally subjected to sunlight is very popular. A major problem that occurs, however, is the connection of the remotely located and widely distributed solar panels (mounted on a roof or other area) to a location at which the generated electricity can be stored or used. Also, because the solar panels are not generally structural elements that can be used in load-bearing applications, mounting the solar panels can be complicated and expensive.

It would be highly advantageous, therefore, to remedy the foregoing and other deficiencies inherent in the prior art.

Accordingly, it is an object of the present invention to provide a new and improved flat roof structure supporting and connecting solar energy systems.

It is another object of the present invention to provide a new and improved flat roof structure supporting and connecting solar energy systems that is relatively simple to install and electrically connect.

SUMMARY OF THE INVENTION

Briefly, to achieve the desired objects of the instant invention in accordance with a preferred embodiment thereof, provided is a solar support structure including a plurality of sections, each section including a channel member having a flat major wall and opposed side walls extending therefrom. The major wall of each section is covered with a thin film solar laminate and each section further includes an electrical connection box positioned adjacent one end and electrically coupled to the thin film solar laminate. The sections are formed into a roof panel by channel-shaped beams attached to opposed ends of each section and the beams mount the sections in a parallel abutting relationship. Columns are affixed to the beams and mount the roof panel in a desired orientation relative to an underlying surface. Electrical wiring from the boxes is positioned in one of the beams and extends into one of the columns.

The desired objects of the instant invention are further achieved in accordance with another embodiment thereof, in which a solar support structure includes a plurality of sections, each section including a channel member having a flat major wall, opposed side walls extending perpendicularly from each edge of the major wall, and flanges extending perpendicularly from each of the opposed side walls inwardly toward each other. The major wall of each section is substantially covered with a thin film solar laminate. Each section further includes an electrical connection box positioned adjacent one end and electrically coupled to the thin film solar laminate. The plurality of sections are separated into a first portion and a second portion, the first portion formed into a first roof panel by two channel-shaped beams attached to opposed ends of the first portion and the second portion formed into a second roof panel by two different channel-shaped beams attached to opposed ends of the second portion. Each of the channel-shaped beams has a flat major wall, opposed side walls extending perpendicularly from each edge of the major wall, and flanges extending perpendicularly from each of the opposed side walls inwardly toward each other. The channel-shaped beams mount the sections of each of the first and second portions in a parallel abutting relationship. Columns are affixed to the channel-shaped beams so as to mount the two roof panels in an adjacent and end-to-end orientation and in a desired orientation relative to an underlying surface. Electrical wiring from the electrical connection boxes extends between two of the channel-shaped beams positioned between the two roof panels and extends into at least one of the columns connected to the two channel-shaped beams down to a ground access.

BRIEF DESCRIPTION OF THE DRAWINGS

The foregoing and further and more specific objects and advantages of the instant invention will become readily apparent to those skilled in the art from the following detailed description of a preferred embodiment thereof taken in conjunction with the drawings, in which.

DETAILED DESCRIPTION OF A PREFERRED EMBODIMENT

Figure 1:
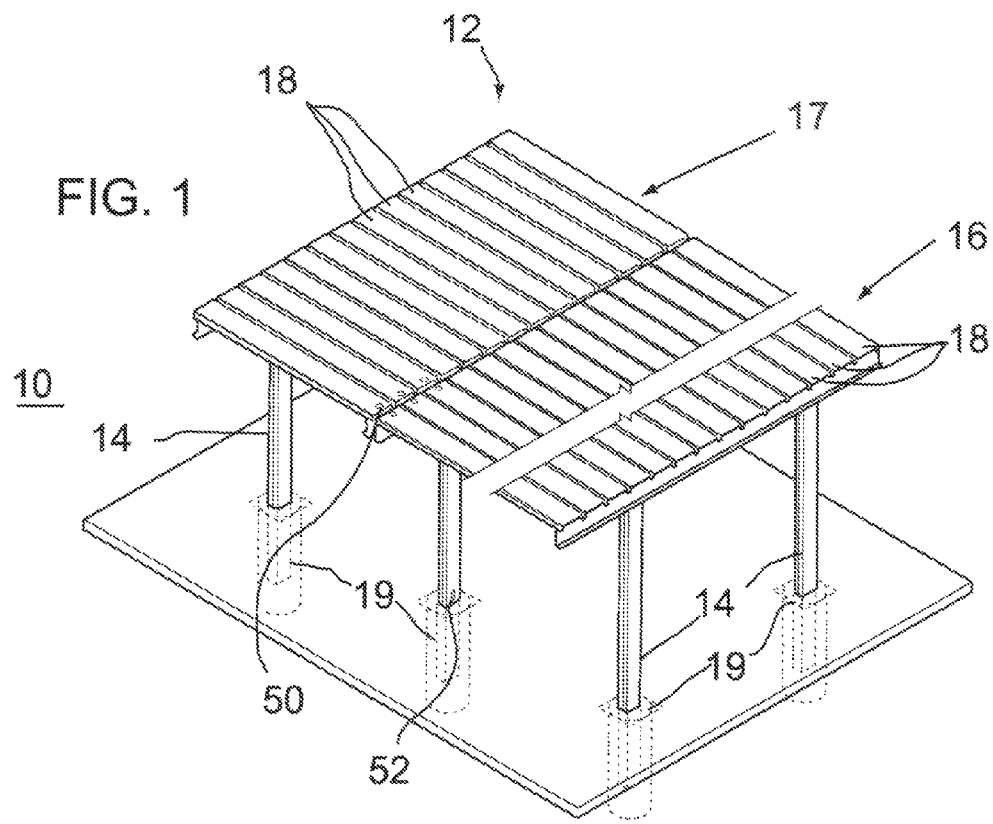
FIG. 1 is an isometric top view of a flat multi-post solar support structure with a connected solar system, in accordance with the present invention.

Referring to FIG. 1, a flat multi-post solar support structure 10 having a connected solar system incorporated therein, in accordance with the present invention, is illustrated. Structure 10 is designed, in this specific application, for use as a car port, patio cover, or the like, but could be used in a variety of other applications. Structure 10 includes a flat roof 12 supported by a plurality of columns or posts 14. In this example roof 12 includes two panels 16 and 17 with each panel including a plurality of sections 18 (in this example fourteen sections are shown in each panel). It will be understood that more or less panels can be used in a specific structure and the two panels illustrated and described are for the best understanding of the invention. Also, any number of sections 18 can be used to form a panel and the panels illustrated are simply for purposes of explanation.

Figure 2:
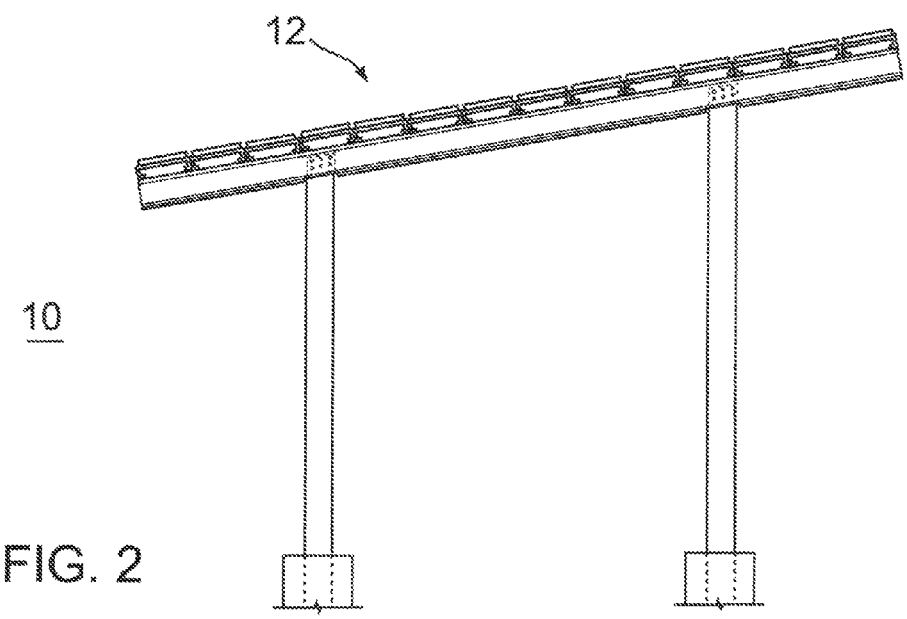
FIG. 2 is a side view of the solar support structure of FIG. 1.

Panels 16 and 17 are each supported by two columns 14 attached adjacent the outer edges and by two columns 14 attached to each panel between the inner edges. The lower ends of columns 14 are fixedly mounted, for example, by embedding them in concrete, asphalt, packed earth, or the like designated 19. It will be understood that the lengths (height) of columns 14 can be adjusted to provide any desired slope to roof 12. Referring additionally to FIG. 2 for example, by forming three columns 14a longer than three columns 14b roof 12 can be provided with a slope of 10 degrees as illustrated or virtually any other slope desired.

Figure 3:
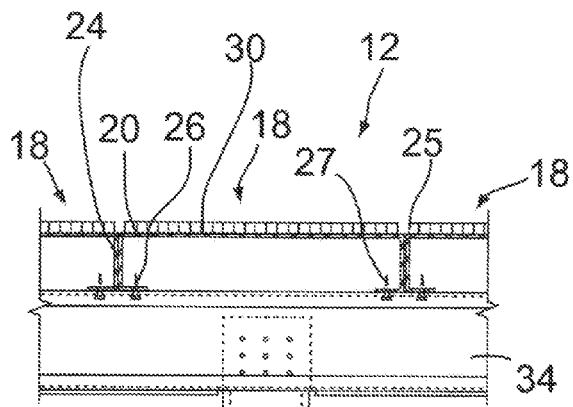
FIG. 3 is an enlarged sectional side view of the column and beam structural area of the solar support structure of FIG. 1.

Referring additionally to FIG. 3, it can be seen that each section 18 includes a channel member 20 having a flat major wall 22, side walls 24 and 25 extending perpendicular to wall 22 from opposite edges and flanges 26 and 27 extending inwardly toward each other perpendicular to side walls 24 and 25. As a typical example and for purposes of explanation, each channel member 20 is formed from a flat stock of 20 gauge steel with major wall 22 being 16 inches wide, side walls 24 and 25 each being 4 inches wide and flanges 26 and 27 each being 1 inch wide. The outwardly directed surface of major wall 22 is covered with a thin film solar laminate 30. It will be appreciated that each section 18 is a structural element and requires no additional elements or components for mounting and assembly.

Figure 6:
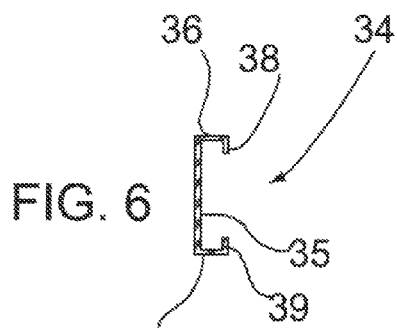
FIG. 6 is a sectional view of a beam used in the support structure of FIG. 1.
Figure 7:
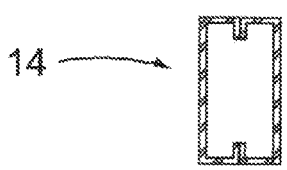
FIG. 7 is a sectional view of a column used in the support structure of FIG. 1.

Referring additionally to FIG. 6 a sectional view of a mounting beam 34 is illustrated. In this specific embodiment, beam 34 is formed similar to channel member 20 with a major wall 35, two side walls 36 and 37 extending perpendicular to wall 35 from opposite edges and flanges 38 and 39 extending inwardly toward each other perpendicular to side walls 36 and 37. As a typical example and for purposes of explanation, each beam 34 is formed from a flat stock of 20 gauge steel with major wall 35 being 8 inches wide, side walls 36 and 37 each being 2½ inches wide and flanges 38 and 39 each being 1 inch wide. Referring additionally to FIG. 7, it can be seen that columns 14 are formed by affixing two beams 34 together by attaching flanges 38 and 39 of each beam 34 in abutting relationship, for example by welding, bolting, etc.

Figure 4:
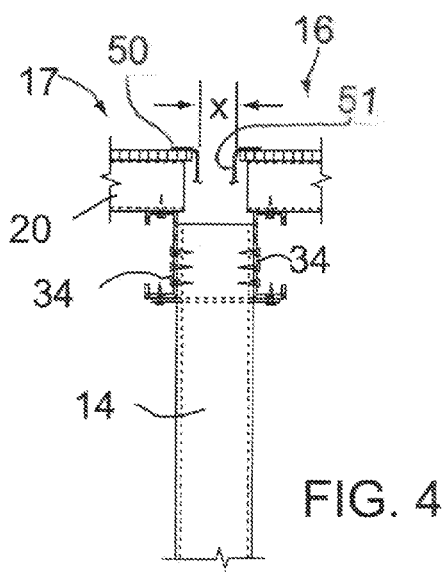
FIG. 4 is an enlarged sectional end view of a column and beam structural area of the solar support structure of FIG. 1.
Figure 5:
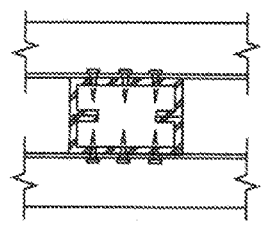
FIG. 5 is an enlarged top view of the column and beam structural area of the solar support structure of FIG. 4.

The construction of structure 10 is generally as follows, major surface 35 of a mounting beam 34 is affixed to the outer surfaces of the two columns 14 at the right of structure 10 (in FIG. 1), major surface 35 of a mounting beam 34 is affixed to the outer surfaces of the two columns 14 at the left of structure 10, and major surfaces 35 of two mounting beams 34 are affixed to the opposite outer surfaces of the two centrally located columns 14. Major surfaces 35 of beams 34 can be affixed to major surfaces 35 of columns 14 by any convenient method such as screws, as illustrated in FIG. 4, or by welding, bolting, etc.

Sections 18 are positioned on the upwardly directed side walls 36 of mounting beams 34 so as to extend between a pair of adjacent mounting beams 34 in a parallel and abutting orientation. Sections 18 are affixed to mounting beams 34 by any convenient method such as screws extending upwardly through the upper side walls 36 of mounting beams 34 and through the flanges 26 and 27 of each of the sections 18 as illustrated in FIG. 3, or by welding, bolting, etc. Further, the pairs of columns 14 are spaced apart approximately the length of sections 18 so that a small space x, approximately the width of the centrally located columns 14 (see FIG. 4), is defined between panels 16 and 17.

Referring again to FIGS. 1 and 4, it can be seen that an electrical connection box 50 is provided at the inner end of each section 18 to include wires, connections, etc. to the thin film solar laminate 30 on the associated section 18. While the term "connection box" is used herein for simplicity of explanation, it will be understood that the connection might actually be a covered terminal board, or any other terminal system that receives input electricity from thin film solar laminate 30 and outputs the electricity through a wire or wires 51. Further, wires 51 and connections from electrical connection boxes 50 are positioned in space x between the adjacent ends of panels 16 and 17. The connecting wires 51 positioned in space x are then directed downwardly in either one or both of the centrally positioned columns 14 and an access opening 52 near the bottom allows convenient access to the connecting wires 51.

Figure 8:
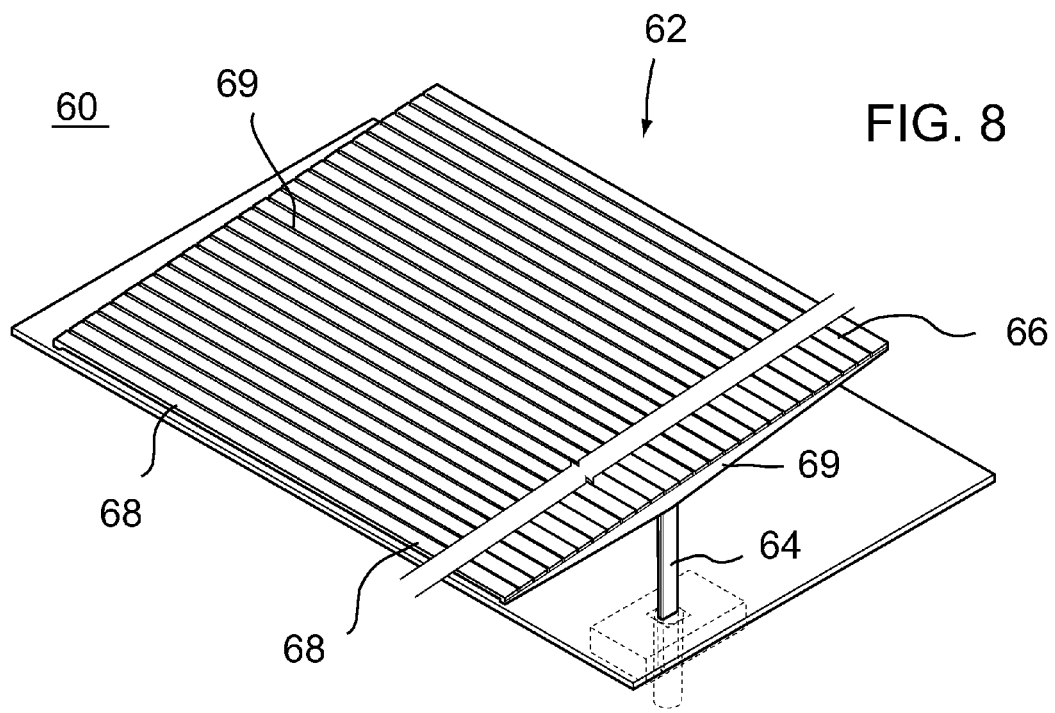
FIG. 8 is an isometric top view of a tee-type flat solar support structure with a connected solar system, in accordance with the present invention.
Figure 9:
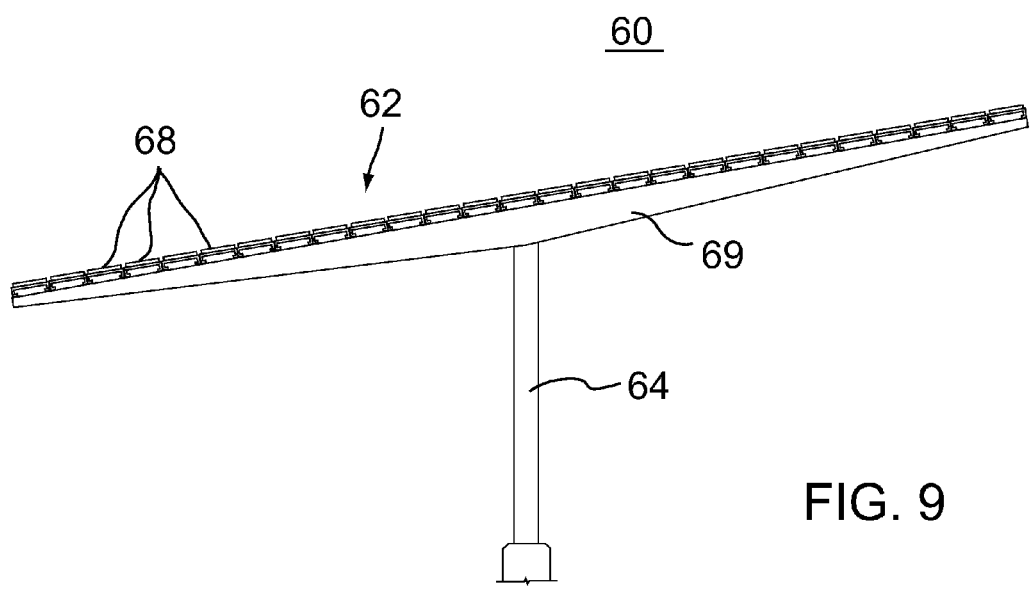
FIG. 9 is an enlarged side view of the tee-type flat solar support structure of FIG. 8.

Turning now to FIGS. 8 and 9, an example of a tee-type flat multi-post solar support structure, designated 60, having a connected solar system incorporated therein, in accordance with the present invention, is illustrated. Structure 60 includes a flat roof 62 supported by a plurality of generally centrally located columns or posts 64 (in this example three). In this example roof 62 includes two panels 66 and 67 with each panel including a plurality of sections 68 (in this example twenty seven sections are shown). All sections 68 are constructed as described above with reference to sections 18. Columns 64 are formed similar to columns 14 above and beams 69 can be formed similar to beams 34 described above. Beams 69, in the alternative, can be formed in a tapered configuration as illustrated if desired. Further, roof 62 can be attached to the upper ends of columns 64 at virtually any desired angle. A 10 degree angle is illustrated in FIG. 9 as an example.

Figure 10:
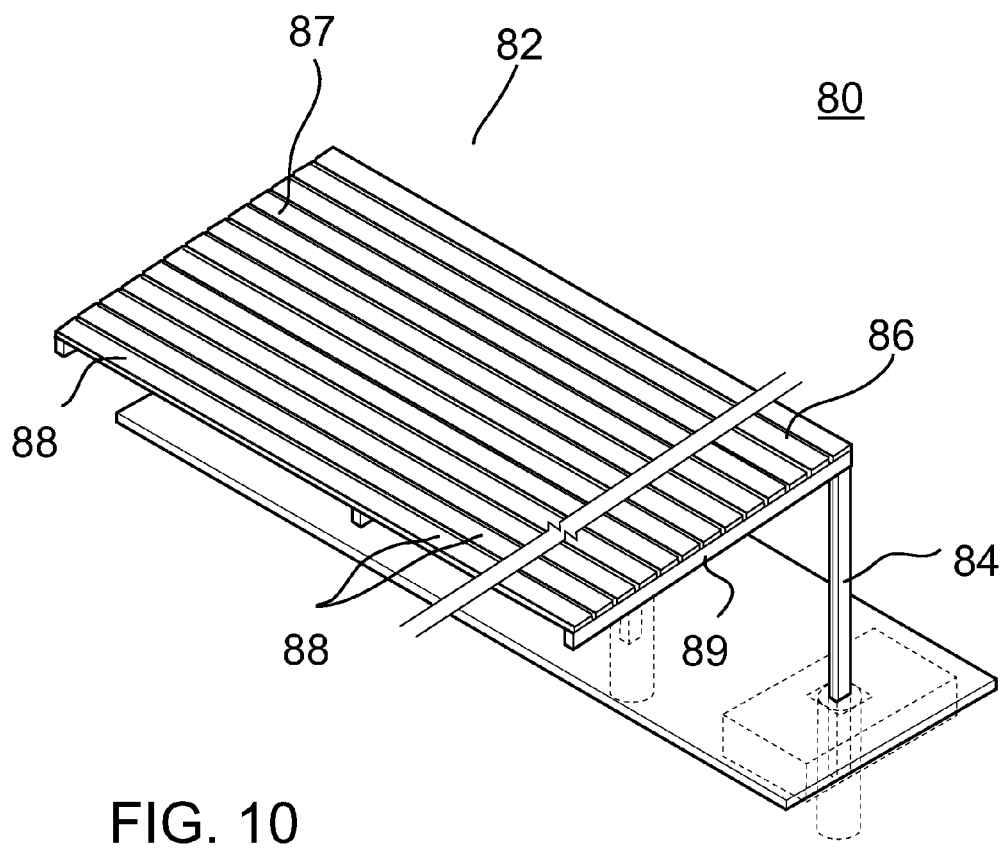
FIG. 10 is an isometric top view of a cantilevered flat solar support structure with a connected solar system, in accordance with the present invention.
Figure 11:
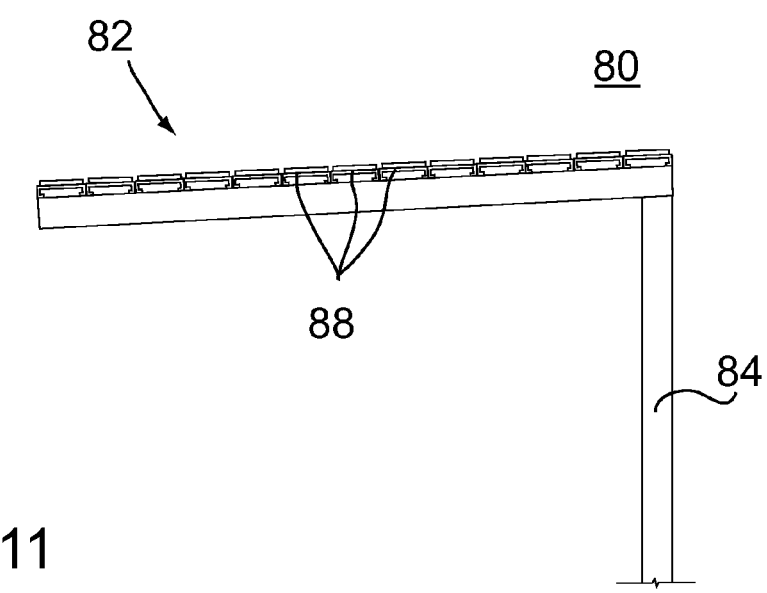
FIG. 11 is an enlarged side view of the cantilevered flat solar support structure of FIG. 10.

Turning now to FIGS. 10 and 11, an example of a cantilevered type flat multi-post solar support structure, designated 80, having a connected solar system incorporated therein, in accordance with the present invention, is illustrated. Structure 80 includes a flat roof 82 supported by a plurality of columns or posts 84 (in this example three) located along one edge. In this example roof 82 includes two panels 86 and 87 with each panel including a plurality of sections 88 (in this example thirteen sections are shown). All sections 88 are constructed as described above with reference to sections 18. Columns 84 are formed similar to columns 14 above and beams 89 can be formed similar to beams 34 described above. Further, roof 82 can be attached to the upper ends of columns 84 at virtually any desired angle. A full cantilever is illustrated in FIG. 11 as an example.

Thus, it will be understood that the new and improved flat solar support structure is constructed to provide easy and convenient electrical connections to solar panels positioned on the roof. The new and improved flat multi-post solar support structure includes a plurality of sections each formed as a structural element and including solar laminate thin film elements electrically connected in common to an electrical connection box on the section. Therefore, no additional structural components are required to mount the sections. Further, the new and improved flat solar support structure is relatively easy to manufacture and assemble since various support and mounting components can be formed from common material, such as flat steel, aluminum, etc. It will be appreciated that substantially all or any convenient components of the solar support structure can be assembled and/or formed at the installation site with a minimum of tools.

Various changes and modifications to the embodiment herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

1. A solar support structure comprising:
   a plurality of sections, each section including a channel member having a flat major wall and opposed side walls extending therefrom, the major wall being substantially covered with a thin film solar laminate, each section further including an electrical connection box positioned adjacent one end and electrically coupled to the thin film solar laminate;

the plurality of sections being formed into two roof panels, each roof panel including a portion of the plurality of sections, each roof panel including two channel-shaped beams attached to opposed ends of each section of the portion of the plurality of sections, the channel-shaped beams mounting the portion of the plurality of sections in a parallel abutting relationship; and a plurality of columns mounting the two roof panels in an adjacent and end-to-end orientation with a space formed therebetween, and in a desired orientation relative to an underlying surface, each of the plurality of columns includes a pair of channel shaped beams having a flat major wall and opposed side walls mounted in parallel with each of the channel-shaped beams of the pair of channel shaped beams having flanges extending perpendicularly from each of the opposed side walls inwardly toward each other and the flanges of each of the channel shaped beams of the pair of channel shaped beams abutting and affixed together to define a rectangular opening extending the length of the pair of channel shaped beams, and electrical wiring from the electrical connection boxes positioned in the space and along at least one of the channel-shaped beams and extending into one end of the pair of channel shaped beams of at least one of the plurality of columns and downwardly to an access opening adjacent the bottom of the at least one of the plurality of columns.

2. A solar support structure as claimed in claim 1 wherein the channel member of each section of the plurality of sections is formed of steel flat stock.

3. A solar support structure as claimed in claim 2 wherein the steel flat stock is approximately 20 gauge.

4. A solar support structure as claimed in claim 1 wherein each section of the plurality of sections includes a channel member having a flat major wall, opposed side walls extending perpendicularly from each edge of the major wall, and flanges extending perpendicularly from each of the opposed side walls inwardly toward each other.

5. A solar support structure as claimed in claim 1 wherein each of the channel-shaped beams has a flat major wall, opposed side walls extending perpendicularly from each edge of the major wall, and flanges extending perpendicularly from each of the opposed side walls inwardly toward each other.

6. A solar support structure as claimed in claim 1 wherein at least one column of the plurality of columns is affixed to each of the channel-shaped beams.

7. A solar support structure comprising:
a plurality of sections, each section including a channel member having a flat major wall, opposed side walls extending perpendicularly from each edge of the major wall, and flanges extending perpendicularly from each of the opposed side walls inwardly toward each other, an outwardly directed surface of the major wall being substantially covered with a thin film solar laminate, each section further including an electrical connection box positioned adjacent one end and electrically coupled to the thin film solar laminate;

the plurality of sections being separated into a first portion and a second portion, the first portion formed into a first roof panel by two channel-shaped beams attached to opposed ends of the first portion and the second portion formed into a second roof panel by two different channel-shaped beams attached to opposed ends of the second portion, each of the channel-shaped beams having a flat major wall, opposed side walls extending perpendicularly from each edge of the major wall, and flanges extending perpendicularly from each of the opposed side walls inwardly toward each other, and the channel-shaped beams mounting the sections of each of the first and second portions in a parallel abutting relationship;

a plurality of columns affixed to the channel-shaped beams so as to mount the two roof panels in an adjacent and end-to-end orientation with a space formed therebetween, and in a desired orientation relative to an underlying surface, electrical wiring from the electrical connection boxes extending in the space formed between two of the channel-shaped beams positioned between the two roof panels and extending into at least one of the plurality of columns connected to the two channel-shaped beams; and each of the plurality of columns includes a pair of channel shaped beams having a flat major wall and opposed side walls mounted in parallel with each of the channel-shaped beams of the pair of channel shaped beams having flanges extending perpendicularly from each of the opposed side walls inwardly toward each other and the flanges of each of the channel shaped beams of the pair of channel shaped beams abutting and affixed together to define a rectangular opening extending the length of the pair of channel shaped beams, and the electrical wiring from the electrical connection boxes positioned in the space and along at least one of the channel-shaped beams and extending into one end of the pair of channel shaped beams of at least one of the plurality of columns and downwardly to an access opening adjacent the bottom of the at least one of the plurality of columns.

* * * * *